United States Patent
Grieser-Schmitz et al.

(10) Patent No.: US 12,184,116 B2
(45) Date of Patent: Dec. 31, 2024

(54) CONTROL CIRCUIT AND CONTROL METHOD FOR PROTECTING ELECTROLYTIC CAPACITORS DURING CHARGING OF ELECTRIC VEHICLES

(71) Applicant: ZF FRIEDRICHSHAFEN AG, Friedrichshafen (DE)

(72) Inventors: Stefan Grieser-Schmitz, Koblenz (DE); Manfred Fuß, Dommershausen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 183 days.

(21) Appl. No.: 17/100,980

(22) Filed: Nov. 23, 2020

(65) Prior Publication Data

US 2021/0155115 A1    May 27, 2021

(51) Int. Cl.
*H02J 7/34* (2006.01)
*B60L 53/62* (2019.01)
(Continued)

(52) U.S. Cl.
CPC ............. *H02J 7/345* (2013.01); *B60L 53/62* (2019.02); *B60L 58/16* (2019.02); *H02J 7/00712* (2020.01); *H02J 2207/50* (2020.01)

(58) Field of Classification Search
CPC .... B60L 53/62; B60L 550/60; B60L 2270/20; B60L 3/0043; B60L 3/00; B60L 58/16;
(Continued)

(56) References Cited

U.S. PATENT DOCUMENTS

| | | |
|---|---|---|
| 2002/0068655 A1 | 6/2002 | Yamada et al. |
| 2005/0200202 A1* | 9/2005 | Mihara ..................... B60L 1/00 307/10.1 |

(Continued)

*Primary Examiner* — Richard Isla
*Assistant Examiner* — Johali A Torres Ruiz
(74) *Attorney, Agent, or Firm* — ROSSI, KIMMS & McDOWELL LLP (57) ABSTRACT

A control circuit (10) is configured and intended for use in an electric vehicle (50). The control circuit (10) comprises a first circuit portion (12), a first power supply line (16), a first controllable switch (19), a second circuit portion (20), a second power supply line (26), a second controllable switch (30) and a switch control unit (36). The first circuit portion (12) comprises at least one electrolytic capacitor (14). The first power supply line (16) is configured to supply the first circuit portion (12) with electrical power. The first controllable switch (19) is arranged in the first power supply line (18), wherein the first switch (19) interrupts the first power supply line (16) in an open state in order to prevent the at least one electrolytic capacitor (14) from being supplied with power. The second power supply line (26) is configured to supply the second circuit portion (20) with electrical power. The second controllable switch (30) is arranged in the second power supply line (26), wherein the second switch (30) in an open state interrupts the second power supply line (26). The switch control unit (36) is configured and intended to control the switching states of the first switch (19) and the second switch (30), wherein the first switch (19) and the second switch (30) are closed in a first control state, and wherein in a second control state the first switch (19) is open and the second switch (30) is closed, wherein the switch control unit (36) is further configured and intended to determine the control state on the basis of functional requirements of the electric vehicle (50).

11 Claims, 5 Drawing Sheets

(51) Int. Cl.
*B60L 58/16* (2019.01)
*H02J 7/00* (2006.01)

(58) Field of Classification Search
CPC .... H02J 7/00712; H02J 7/345; H02J 2207/50; H02J 2310/48; Y02T 10/70; Y02T 10/7072; Y02T 90/12; B60R 16/03
See application file for complete search history.

(56) References Cited

U.S. PATENT DOCUMENTS

| | | | |
|---|---|---|---|
| 2007/0024112 A1* | 2/2007 | Lindqvist | B60T 13/741 303/122.04 |
| 2014/0078801 A1* | 3/2014 | Timmons | B60L 50/51 323/311 |
| 2014/0097785 A1* | 4/2014 | Henness | H02P 23/00 318/767 |
| 2014/0292286 A1* | 10/2014 | Tabata | H02P 9/102 322/94 |
| 2014/0313781 A1* | 10/2014 | Perreault | H01G 4/38 363/13 |
| 2017/0250547 A1* | 8/2017 | Menze | H02J 7/0024 |
| 2018/0019602 A1* | 1/2018 | Hasan | H02J 7/0031 |
| 2019/0041934 A1* | 2/2019 | Tan | G06F 1/266 |
| 2020/0343813 A1* | 10/2020 | Nanba | H02N 11/002 |

* cited by examiner

CONTROL CIRCUIT AND CONTROL METHOD FOR PROTECTING ELECTROLYTIC CAPACITORS DURING CHARGING OF ELECTRIC VEHICLES

RELATED APPLICATION

This application claims priority from German Application No. 10 2019 218 163.5, filed Nov. 25, 2019, the subject matter of which is incorporated herein by reference in its entirety.

BACKGROUND OF THE INVENTION

A control circuit and a control method are described here which distinguish between different operating states of an electric vehicle that pose different functional requirements. The control circuit controls the supply of power to various consumers through various circuit portions in accordance with the functional requirements. Circuit portions that are not required are not supplied with electrical power.

STATE OF THE ART

Previous control circuits have been configured to supply all consumers with electrical power at the same time. This is particularly useful for motor vehicles having internal combustion engines, because the motor vehicle is only switched on to get around. So either all or none of the functions are needed. Such a control circuit is thus kept simple and inexpensive.

For the supply of electrical power to consumers by means of a control circuit, electrolytic capacitors, among other things, are used because of their filter and storage function. Electrolytic capacitors have a relatively high capacitance. This also allows unwanted frequencies from several 10s of Hertz (Hz) to a few megahertz to be decoupled.

Underlying Problem

Electric vehicles have much longer operating times than classic vehicles with internal combustion engines. In addition to the time that the vehicle spends in a moving operating state, the electric vehicle must also perform certain (electronic) functions, for example when charging. In contrast, a motor vehicle having an internal combustion engine does not need to perform electronic activities when refueling. In this sense, an electric vehicle is approximately three times as long in an operating state that does not require all functionalities than in an operating state (e.g. driving) that requires full functionality.

The service life of electrolytic capacitors depends, among other things, on the time in which a voltage is applied to them. The increased operating times of the electric vehicles therefore have a negative effect on the electrolytic capacitors. The life of the electrolytic capacitors is used up faster and the functionality of the electrolytic capacitors deteriorates more quickly. At the same time, it is desirable to produce control circuits for an electric vehicle as inexpensively and simply as possible.

The object is therefore to provide a control circuit and a control method for an electric vehicle which results in a longer use of the electrolytic capacitors and at the same time is inexpensive.

Proposed Solution

This object is achieved by a control circuit and a control method having the features set forth in the independent claims.

Preferred embodiments are evident from the dependent claims and the description below.

One aspect relates to a control circuit configured and intended for use in an electric vehicle. This control circuit comprises a first circuit portion which comprises at least one electrolytic capacitor. Furthermore, the control circuit comprises a first power supply line, which is configured to supply the first circuit portion with electrical power. The control circuit further comprises a first controllable switch in the first power supply line, wherein the first switch interrupts the first power supply line in an open state in order to prevent a supply of the at least one electrolytic capacitor with power. The control circuit further comprises a second circuit portion and a second power supply line, which is configured to supply the second circuit portion with electrical power. The control circuit further comprises a second controllable switch in the second power supply line, wherein the second switch in an open state interrupts the second power supply line. The control circuit further comprises a switch control unit which is configured and intended to control the switching states of the first switch and the second switch, wherein the first switch and the second switch are closed in a first control state, and wherein the first switch is open and the second switch is closed in a second control state, wherein the switch control unit is further configured and intended to determine the control state based on functional requirements of the electric vehicle.

In this way, it is possible for the at least one electrolytic capacitor in the first circuit portion to not be supplied with electrical power when the first circuit portion is not required. If the functional requirements of the electric vehicle require the second control state, the first control portion is not energized and the first control portion is energized. As a result, the remaining service life of the at least one electrolytic capacitor is necessarily shortened. The at least one electrolytic capacitor is protected.

The control circuit can be part of a control device. Various elements or consumers can be connected downstream of the control circuit. At least one consumer is preferably connected downstream of each circuit portion. It is possible for the first power supply line to be connected at one of its ends to a pole of a (first) power source. The other end of the first power supply line is connected to the first circuit portion. The other pole of the (first) power source can be connected to an end of the first circuit portion remote from the first power supply line or to a consumer connected thereto. The other pole may also consist of a ground, such as the vehicle frame or the ground under the vehicle. It is also possible for the first power supply line to comprise two cables (/lines/conductors). The two cables are on one side connected to one of the two poles of the (first) power source and on the other side are connected to different ends of the first circuit portion. In this case, one or both of the cables may comprise the first controllable switch. The aforementioned options also apply in an analogous manner to the second power supply line. The (first/second) power source can be any of the following: battery, direct current source, generator or similar item. The first or second circuit portion can be supplied with electrical power via a closed circuit, as described above, for example—that is, a voltage can be applied and a current flows through the first or second circuit portion.

The first or second controllable switch can also be any of the following forms: relay, electronic switch, transistor, FET, BJT, MOSFET/MISFET, JFET. The first or second switch can be normally blocking or normally conducting. The first or second switch can be arranged such that, in an open state, it interrupts the first or second power supply line and thereby interrupts the energization/electrical supply of the first or second circuit portion. When the first or second switch is closed, the first or second circuit portion is energized. The first or second switch can be installed in the middle of the first or second power supply line. In this case, a first portion of the first or second power supply line is connected to the first or second switch on one side thereof and a second portion of the first or second power supply line is connected to the other side of the first or second switch connected thereto. It is also possible that the first or second switch is connected to the first or second power supply line at an end thereof. Thus, the first or second switch can be connected on one side to a first or second battery or other power source and on the other side to the first or second power supply line. The first or second switch can also be connected on one side to the first or second circuit portion and on the other side to the first or second power supply line.

The switch control unit (MPU, English abbreviation for "micro processing unit"/microprocessor) can be part of a main processor of the electric vehicle or an independent processor.

The first circuit portion can be configured and intended to supply an engine control unit with power as the main consumer of the electric vehicle. The second circuit portion can be configured and intended to supply at least one secondary consumer of the electric vehicle with electrical power.

In this way, the supply of electrical power to the engine control unit (through the first circuit portion) can be prevented in a second control state of the switch control unit. If the electric vehicle is only charged, for example, there are no functional requirements for the engine and engine control unit. The electrolytic capacitors in the first circuit portion are preserved by preventing the supply of electrical power to the engine control unit that is not required.

Valve coils, a parking brake control, light sources or other elements can be connected to the second circuit portion as secondary consumers.

The control circuit can further comprise a third circuit portion, which comprises at least one electrolytic capacitor. In that case, the control circuit can comprise a third power supply line, which is configured to supply the third circuit portion with electrical power. The control circuit can furthermore comprise a third controllable switch, wherein the third switch interrupts the third power supply line in an open state in order to prevent supplying the at least one electrolytic capacitor with power in the third circuit portion. The switch control unit can be configured and intended to control the switching state of the third switch, wherein the third switch is closed in the first control state, and wherein the third switch is open in the second control state.

The third power supply line and the third switch can be designed or configured and intended analogously to the previously described first power supply line and first switch. It is also possible that there are further (fourth, fifth, nth) circuit portions with associated power supply lines and switches. The third circuit portion can be configured and intended to supply a parking brake controller of the electric vehicle with electrical power.

The potentially possible further circuit portions can supply certain consumers with electrical power. It is also possible for one circuit portion to supply a plurality of consumers with electrical power. The switches (third to nth switches) can all be closed in the first control state and open in the second control state. It is also possible that some of the switches are closed in both control states, like the first switch. There can also be more than two control states: each further control state can represent a further combination of open and closed (first to nth) switches. For example, in a third control state, the first and second switches can be open and the third switch can be closed. The further states can thus represent further combinations of functional requirements of the electric vehicle. It can be particularly desirable not to provide electrical power to circuit portions that include electrolytic capacitors as often as possible.

The control circuit can further comprise an additional switch, which, in a closed state, connects the first power supply line and the second power supply line, and wherein the additional switch is connected to the first or second power supply line on a side of the first or second switch facing the first or second circuit portion.

In this way, the first circuit portion can also be supplied with electrical power when the first switch is open (and the additional switch is closed). The purpose of this can be for a voltage from a second power source, such as a battery, to be applied to the first circuit portion. This can also be useful if the different power sources, such as batteries, have different capacities and/or are to be used to different degrees. The second circuit portion with the additional switch closed and the second switch open can also be supplied with the voltage of the first power source. This is also possible analogously with the third (or further) circuit portions and further additional switches. One of the additional switches can also connect more than two circuit portions at the same time.

The first power supply line and the second power supply line can be configured and intended to be supplied with electrical power from the same power source, in particular the same battery.

This means that fewer separate batteries are required. Another power source can be used instead of a battery. In the case of more than two circuit portions, all (of the more than two) power supply lines can be connected to the same battery. It is also possible that a plurality of power supply lines are connected to one of a plurality of batteries.

The first power supply line and the second power supply line can run at least partially as one line on a side of the first switch or the second switch facing away from the first circuit portion or the second circuit portion.

This means that less cable (or other line material) is required.

It is possible that the first power supply line is configured and intended to have a first supply voltage applied thereto, and the second power supply line is configured and intended to be acted upon by a second supply voltage.

This is advantageous if the consumers of the different circuit portions require different voltages. The different supply voltages can be generated by different current sources or by a current source having different upstream resistors (or circuits). With more than two circuit portions, more than two supply voltages are possible, wherein it is also possible for there to be fewer different supply voltages than circuit portions.

The first circuit portion and the second circuit portion can each comprise ceramic capacitors.

Particularly when the ceramic capacitors are connected in the same circuit portion to the at least one electrolytic capacitor, this brings about a further reduction in the wear and tear of the at least one electrolytic capacitor. The second circuit portion can also comprise one or more electrolytic capacitors.

The first control state can be configured and intended to represent a driving state (as an operating state) of the electric vehicle. The second control state can be configured and intended to represent a charging state (as an operating state) of the electric vehicle.

Other operating states of the electric vehicle can also be represented by control states, such as: updating the software of the electric vehicle, preheating the interior of the electric vehicle, displaying information and/or operating the radio without operating the engine. It is also possible for one control state to represent a plurality of electric vehicle states.

The control circuit can furthermore comprise a further first controllable switch which is arranged on a side facing away from the first switch of the at least one electrolytic capacitor comprised by the first circuit portion, wherein the further first switch interrupts a line in an open state in order to prevent the provision of a supply of electrical power to the at least one electrolytic capacitor. In this case, the switch control unit can be configured and intended to control the switching state of the further first switch, wherein the further first switch is closed in the first control state, and wherein the further first switch is open in the second control state.

If the lines on both sides of the electrolytic capacitor(s) are interrupted, the electrical voltage across the electrolytic capacitor(s) cannot change, thereby protecting the electrolytic capacitor(s).

The first and/or second and/or third power supply line can be configured to be supplied with electrical power from a power supply or power source, such as a battery. A respective power supply line can be configured to be supplied with power from a corresponding first and/or second and/or third power supply or power source, such as a voltage converter or a battery.

Another aspect relates to a control method that is used in an electric vehicle, wherein the control method is carried out by means of one of the preceding control circuits, and wherein the control method comprises at least the following steps:

determining the control state from the functional requirements of the electric vehicle, controlling the first switch and the second switch via the switch control unit in accordance with the control state.

Still another aspect relates to an electric vehicle that includes a control circuit described above.

In contrast to conventional control circuits, the solution presented here provides a control circuit which supplies electrolytic capacitors with electrical power only when their function is required. This maximizes the life of the electrolytic capacitors.

The solution presented uses a small number of conventional circuit elements. This ensures inexpensive production.

It is evident to a person skilled in the art that the aspects and features described above can be combined as desired in a control circuit and/or a control method. Although some of the features described above were described in relation to a control circuit, it is understood that these features can also apply to a control method. In the same way, the features described above in relation to a control method can also apply in a corresponding manner to a control circuit.

BRIEF DESCRIPTION OF THE DRAWING

Further objectives, features, advantages, and possible applications result from the following description of embodiments, to be understood as non-restrictive, with reference to the associated drawings. All features described and/or illustrated herein, on their own or in any combination, show the object disclosed here. The dimensions and proportions of the components shown in the drawings are not to scale. Identical or identically acting components are provided with the same reference symbols. In the circuit diagrams, elements that are the same or have the same effect are shown with the same circuit symbols.

DETAILED DESCRIPTION OF THE DRAWINGS

Within the framework of the following disclosure, certain aspects are described primarily with reference to the control circuit. However, these aspects are of course also valid within the framework of the disclosed control method, which can be carried out, for example, with the aid of a central engine control unit (ECU) of an electric vehicle. This can be done by creating suitable write and read access to a memory assigned to the electric vehicle. The control method can be implemented within the electric vehicle both in hardware and software as well as a combination of hardware and software. This also includes digital signal processors, application-specific integrated circuits, field programmable gate arrays and other suitable switching and computing components.

Figure 1:
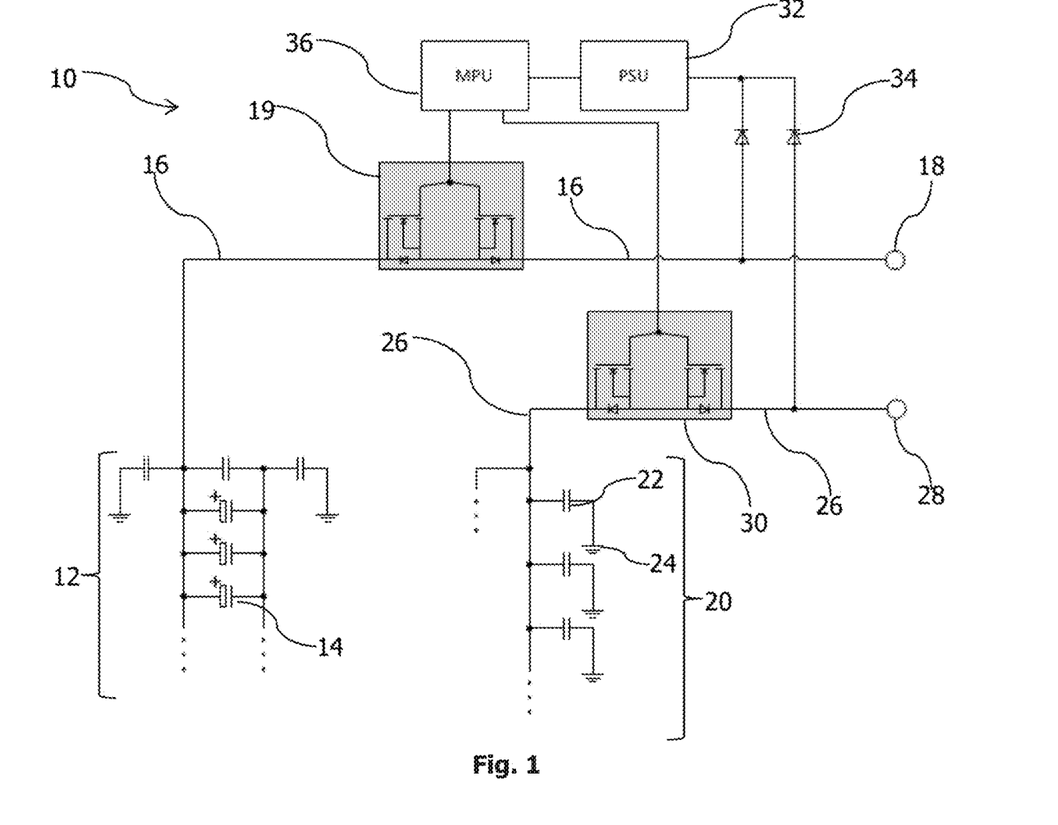
FIG. 1 is a circuit diagram of a control circuit.

FIG. 1 shows a circuit diagram of a control circuit 10. The control circuit 10 has a first circuit portion 12 which comprises at least one electrolytic capacitor 14. In FIG. 1, only one electrolytic capacitor has been designated with the reference number. This is not to be interpreted restrictively. Elements having the same circuit symbol designate the same component. In FIG. 1, the first circuit portion 12 also includes capacitors 22 and grounds 24. It is also possible that these elements are not included. The first circuit portion 12 can comprise further elements and a consumer is connected to the first circuit portion 12. This is indicated in FIG. 1 by three points which indicate that further elements are no longer shown in the figure. The first circuit portion 12 is connected to a first power supply line 16. The first power supply line is also connected to one pole of a first battery 18. Any type of electrical power source can function as the first battery 18. The first power supply line 16 supplies the first circuit portion 12 with electrical power. The supply of electrical power can be interrupted by a first controllable switch 19 (or simply: first switch 19). The first switch 19 is highlighted in FIG. 1 in a gray box and is located in the first power supply line 16. In the gray box, another type of switch can also function as the first switch.

In an analogous manner, the control circuit 10 also has a second circuit portion 20, which can include capacitors 22 and grounds 24. The second circuit portion 20 is connected to the second power supply line 26, which is also connected to one pole of a second battery 28. Any type of electrical power source can function as the second battery 28. The second power supply line 26 can be interrupted by a second controllable switch 30.

Furthermore, the control circuit 10 has a power supply unit 32 (PSU). The power supply unit 32 is fed by both power supply lines 16 and 26. The lines which connect the power supply unit 32 to the power supply lines 16 and 26 each have a diode 34. These lines are attached to the respective power supply line on a side of the first or second power supply line 16/26 facing the first or second battery 18/28, as seen from the first or second switch 19/30. It is also possible that these lines are attached on the other side, as seen from the respective switches. In this case, at least one of the first and second switches 19 and 30 should always be closed. It is also possible that the power supply unit 32 is fed by another power source or only one of the first and second batteries 18 and 28. It is also possible to omit the diodes 34. The power supply 32 supplies a switch control unit 36 with electrical power. The switch control unit 36 controls the first switch 19 and the second switch 30.

In FIG. 1, the first control portion 12 comprises a plurality of electrolytic capacitors 14, capacitors 22 and grounds 24. This structure is intended to filter a supply of electrical power (/voltage) for a downstream main consumer. The structure of the first control portion 12 shown in FIG. 1 (as well as the structure of the second control portion 20 shown) is only an example. Other combinations of electronic components to form a first control portion 12 are also conceivable. For the purposes of the invention, only at least one electrolytic capacitor 14 should be included in the first control portion. Similarly, the second control portion 20 can also be constructed differently. It is not absolutely necessary (but possible) for the second control portion 20 to include an electrolytic capacitor 14.

The first control portion 12 and the second control portion 20 each supply electrical power to consumers connected downstream. These consumers can be connected (downstream) to the control portions in various ways. For example, it is possible for a consumer to be connected in parallel at the points to the electrolytic capacitors 14 as in the first circuit portion 12. A consumer can also be connected to them at the lower points as in the second circuit portion 20.

In the control circuit 10 of FIG. 1, it can be seen from the alignment of the electrolytic capacitors 14 and the diodes 34 that the poles of the first and second batteries 18 and 28 which are shown are positive poles. It is also conceivable that the poles of the first and second batteries 18 and 28, to which the first and second power supply lines 16 and 26 are connected, represent negative poles. In such a case, the electrolytic capacitors 14 and the diodes 34 would have to be adapted to them, for example: be arranged the other way around. An alternating current source as first and second batteries 18 and 28 is also conceivable. In this case, the rest of the control circuit 10 would also have to be adapted to this. This is possible, for example, with a rectifier.

The switch control unit 36 controls the first switch 19 and the second switch 30 according to a control method. The architecture of the control method is shown schematically in FIG. 2. In a first step S1, an operating state of the electric vehicle is determined. This operating state can be, for example, a driving state, a charging state or an update state during a standstill or sleep mode of the electric vehicle. A control state is determined from the operating state of the electric vehicle. If the electric vehicle is in a driving state, for example, the first control state is determined. In this case, the first switch 19 and the second switch 30 are closed, as shown in the second step S2 in FIG. 2. Both circuit portions are thus supplied with electrical power. If, for example, the first circuit portion 12 supplies an engine control unit with power and the second circuit portion 20 supplies a battery monitoring system with power, both systems, the engine control unit and the battery monitoring system, are supplied with power. If, on the other hand, the electric vehicle is in a charging state, for example, the second control state is determined. In this case, the first switch 19 is open and the second switch 30 is closed, as shown in the third step S3. If, for example, the first circuit portion 12 supplies an engine control unit with power and the second circuit portion 20 supplies a battery monitoring system power, only the battery monitoring system is supplied with power. The engine control unit is not supplied with power. Subsequently, whether the operating state of the electric vehicle changes is monitored in the fourth step S4. If this operating state changes, the control method starts again from step S1.

Figure 2:
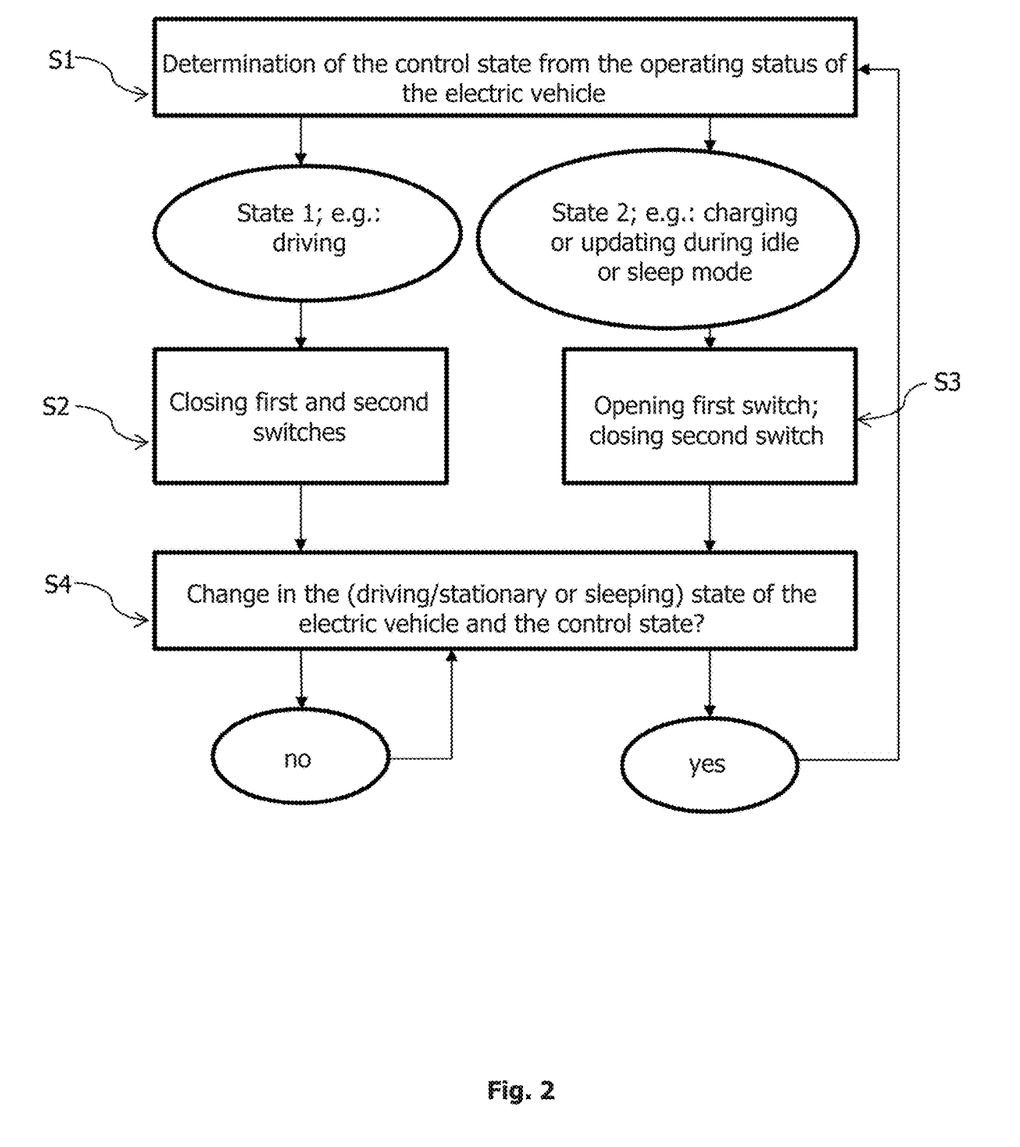
FIG. 2 schematically shows the architecture for a control method

A further control state is also possible in which the first and second switches 19 and 30 are open. In this case, neither the first circuit portion 12 nor the second circuit portion 20 are supplied with electrical power. This control state can correspond to minimal functional requirements of the electric car, for example when it is parked and neither software updates are carried out nor is the vehicle being charged.

Figure 3:
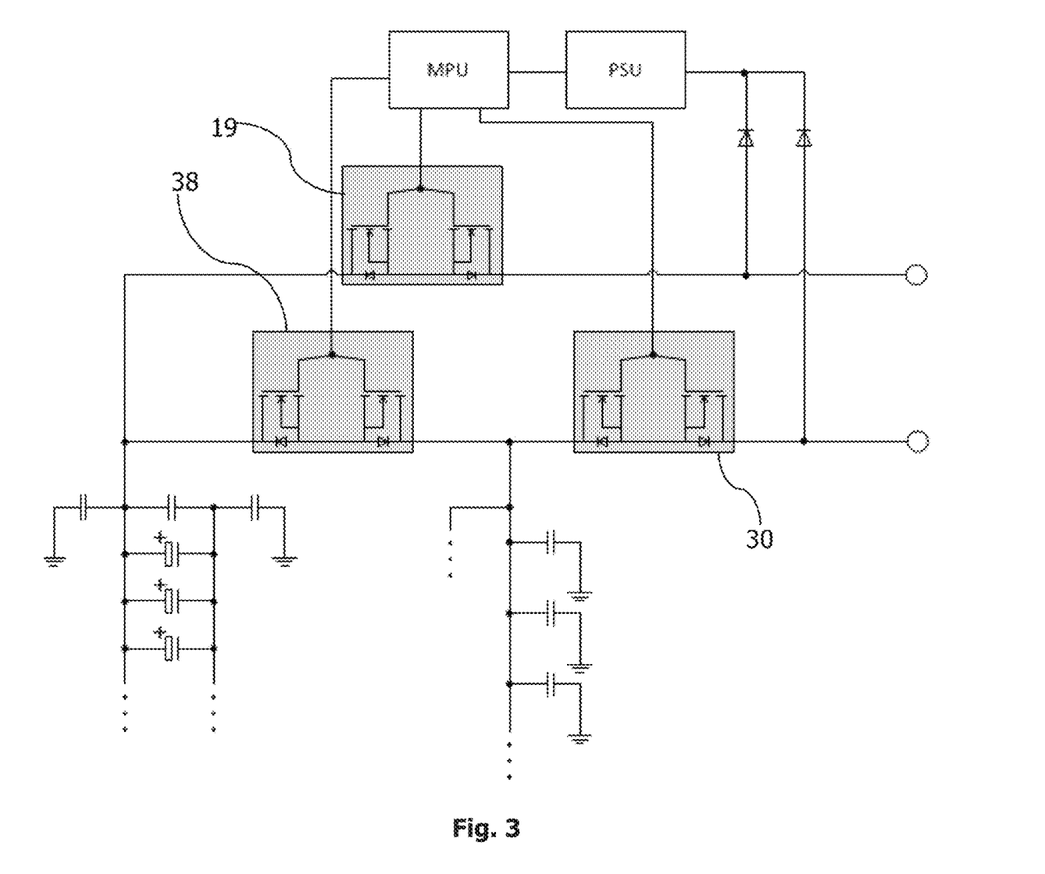
FIG. 3 is a circuit diagram of another control circuit.

FIG. 3 shows a control circuit which is similar to the control circuit from FIG. 1 and also has an additional switch 38. The other elements from FIG. 3 are identical to the elements in FIG. 1. For these elements, reference is made to the preceding description of FIG. 1. The additional switch 38 connects the first circuit portion 12 and the second circuit portion 20. The additional switch 38 is controlled via the switch control unit 36. The voltage of the respective other battery 28 or 18 can be applied to the first circuit portion 12 or the second circuit portion 20 via the additional switch 38. Thus, the first battery 18 can supply both circuit portions with electrical power by the first switch 19 and the additional switch 38 being closed and the second switch 30 being open. Alternatively, the second battery 28 can supply electrical power to both circuit portions by the second switch 30 and the additional switch 38 being closed and the first switch 19 being open. This can be useful for utilizing just one of the batteries for a certain period of time. It is also possible in this way to apply different voltages from the different batteries to the circuit portions.

Figure 4:
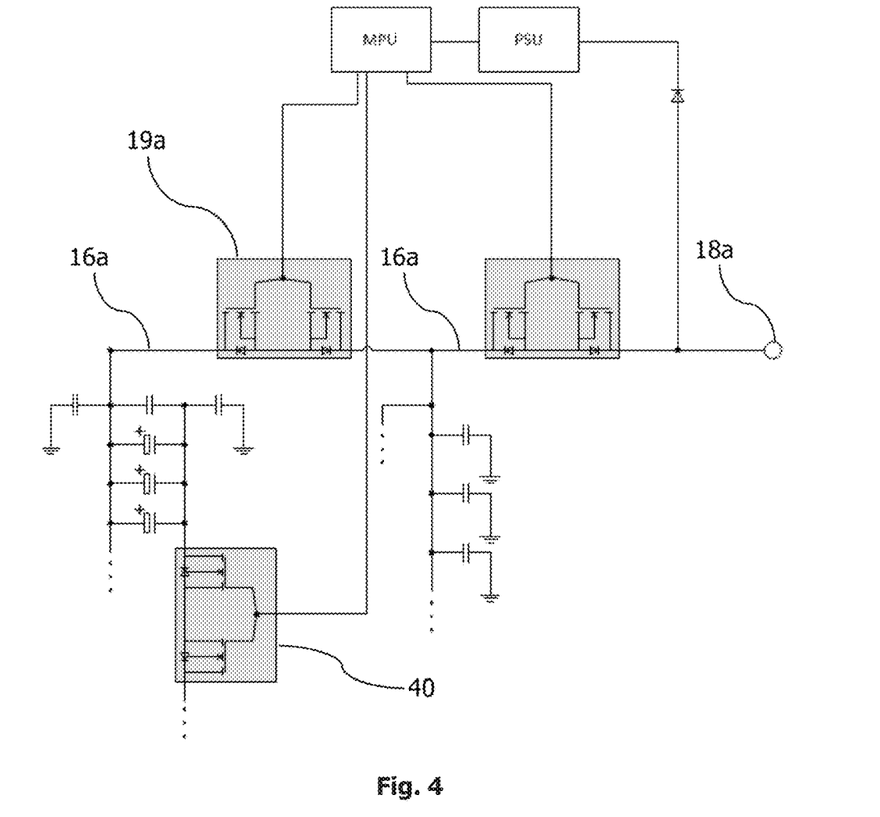
FIG. 4 is a circuit diagram of another control circuit.

FIG. 4 shows a control circuit 10 as in FIG. 1 with two changes that are independent of one another: on one side, the first switch 19a and the first power supply line 16a are not connected directly to a battery, but rather to the second power supply line. As a result, there is also only one battery 18a. On the other side, a further first controllable switch 40 is connected to or in the first control portion. The other elements are the same as the elements from FIG. 1. For these elements, refer to the preceding description of FIG. 1.

The alternative arrangement and connection of the first switch 19a and the first power supply line 16a can produce a shorter first power supply line 16a.

This makes the control circuit 10 even more cost-effective to produce. This alternative makes no difference for the selective, supply of electrical power to the first and second circuit portions 12 and 20 according to the first and second control states: in the first control state, both switches are closed. Both control portions (and the respective downstream consumers) are thus supplied with electrical power. In the second control state, the second switch 30 is closed and the first switch 19a is open. The second control portion (with the corresponding consumer) is thus supplied with electrical power, while the first control portion is cut off from the supply of electrical power. In another case, in which there are minimal functional requirements of the electric vehicle (e.g. parking without charging and/or software updating) and a supply of electrical power to the first and second circuit portions 12 and 20 is not required, it is sufficient to open the second switch 30.

The arrangement of the control circuit 10 from FIG. 1 is advantageous compared to the arrangement of the control circuit 10 from FIG. 3 if, in a possible third control state, the first circuit portion is to be supplied with electrical power while the second circuit portion is to be cut off from the supply of electrical power. This is possible with the control circuit from FIG. 1 by the first switch being closed and the second switch being open.

The further first controllable switch 40 in FIG. 4 is preferably arranged in such a way that all electrolytic capacitors 14 are (electronically) located in the first circuit portion 12 between the first switch 19 or 19a and the further first switch 40. If the first switch 19 or 19a is activated in such a way that it is open (for example in the second control state), the further first switch 40 is preferably also activated in such a way that it is open. In the same way, the further first switch 40 is preferably closed when the first switch 19 or 19a is closed. Even if the opening of one of the first switch 19 or 19a and a further first switch 40 interrupts the circuit in the first circuit portion, it can still be advantageous to open both switches. If both switches (19/19a and 40) are open, the electrical potential on both sides (anode and cathode) of each of the electrolytic capacitors 14 does not change. This further slows down the aging process of the electrolytic capacitors 14. To control the further first switch 40, it is possible that the first switch 19 or 19a and the further first switch 40 are controlled using the same connection of the switch control unit 36—so that the control lines of the first switch 19 or 19a and of the further first switch 40 run in part as one line.

It is also possible for the combination of first switch 19 or 19a, second switch 30 and (potential) additional switch 38 to constitute a switch module. Thus, each of FIGS. 1, 3 and 4 would show a different switch module. One of these different switch modules could be inserted into a slot in the control circuit that was initially left open. The control circuit would only be completed by inserting one of the switch modules. In this way, the production price of the control circuit could be further reduced.

Figure 5:
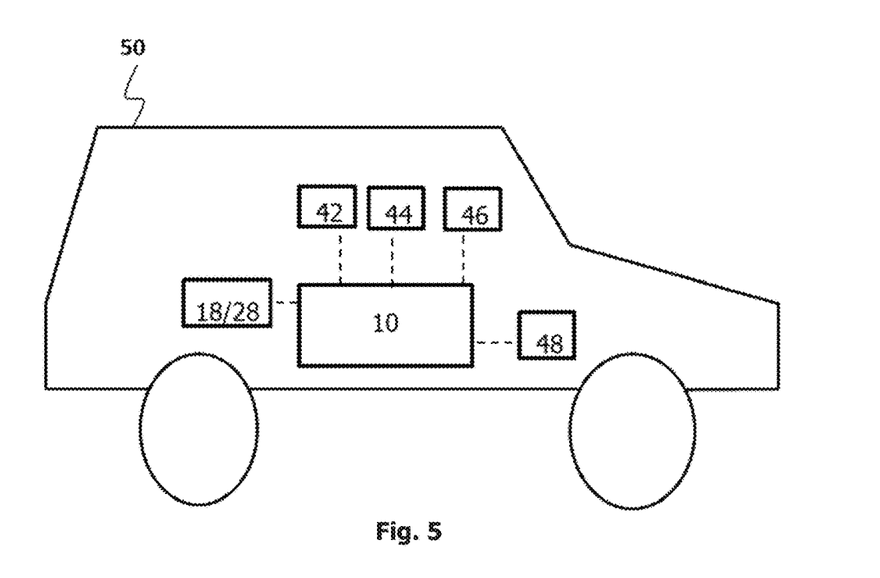
FIG. 5 schematically shows a motor vehicle.

FIG. 5 schematically shows an electric vehicle 50 which comprises a control circuit 10. The control circuit 10 is connected to at least one battery 18 and/or 28, an engine control unit 42, valve coils 44, a parking brake control 46 and other circuit parts 48. The engine control unit 42, the valve coils 44, the parking brake controller 46 and the other circuit parts 48 are each or in groups connected to one of the switching portions 12 and 20 in such a way that they are supplied with electrical power, although there can also be more than two switching portions. The other circuit parts 48 can represent a plurality of consumers and be connected to more than one circuit portion.

Figure 6:
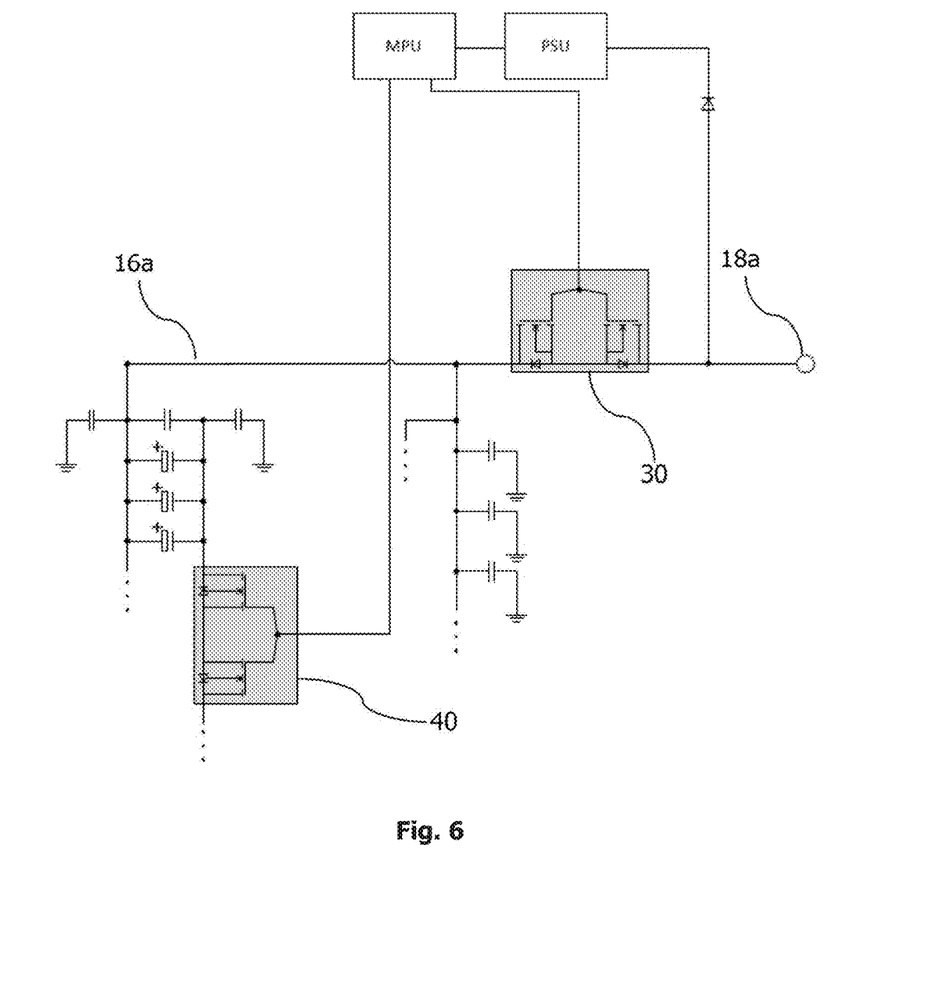
FIG. 6 is a circuit diagram of another control circuit.

FIG. 6 shows a variant which is essentially identical to the embodiment of FIG. 4 and in which the same components are provided with the same reference numbers. The embodiment in FIG. 6 differs only in that the first switch 19a is omitted and the first power supply line 16a can be disconnected from the first battery via the remaining switch. The first control portion can be disconnected from a power supply on the ground side via the first switch 40, so that the at least one electrolytic capacitor can be protected. This variant represents a particularly cost-effective alternative to the embodiment according to FIG. 4.

It is understood that the embodiments described above are not exhaustive and do not limit the object disclosed here. In particular, it is obvious to a person skilled in the art that it is possible to combine the described features in any way and/or to omit various features without deviating from the object disclosed here.

The invention claimed is:

1. A control circuit (10) for an electric vehicle (50), the control circuit comprising:

a first circuit portion (12), which comprises electrolytic capacitors (14), a first power supply (18), a first power supply line (16), which is configured to supply the first circuit portion (12) with electrical power via the first power supply, a first controllable switch (19) in the first power supply line (16), wherein the first controllable switch (19) is configured to interrupt the first power supply line (16) in an open state in order to prevent the supply of electrical power to the electrolytic capacitors (14), a second circuit portion (20), a second power supply (28), a second power supply line (26), which is configured to supply the second circuit portion (20) with electrical power via the second power supply, a second controllable switch (30) in the second power supply line (26), wherein the second controllable switch (30) is configured to interrupt the second power supply line (26) in an open state, a further first controllable switch (40) arranged on a side of all of the electrolytic capacitors (14) of the first circuit portion (12), the further first controllable switch (40) configured to interrupt the first power supply line in the open state, in synchronous operation with the first controllable switch, to prevent supply of power to all of the electrolytic capacitors (14) in the first circuit portion (12), the further first controllable switch unusable to control a state of the second circuit portion, and a switch control unit (36), which is configured to control the switching states of the first controllable switch (19), the further first controllable switch (40), and the second controllable switch (30), wherein in a first control state the first controllable switch (19), the further first controllable switch (40), and the second controllable switch (30) are closed, and wherein in a second control state the first controllable switch (19) and the further first controllable switch (40) are open and the second controllable switch (30) is closed, wherein the switch control unit (36) is further configured to determine the control state based on functional requirements of the electric vehicle (50).

2. The control circuit (10) according to claim 1, wherein the first circuit portion (12) is configured to supply an engine control unit (42) with electrical power as the main consumer of the electric vehicle (50), and wherein the second circuit portion (20) is configured to supply at least one secondary consumer of the electric vehicle (50) with electric power.

3. The control circuit (10) according to claim 1, further comprising:

a third circuit portion, which comprises at least one electrolytic capacitor (14), a third power supply, a third power supply line, which is configured to supply the third circuit portion with electrical power via the third power supply, a third controllable switch, wherein the third controllable switch is configured to interrupt the third power supply line in an open state in order to prevent a supply of power to the at least one electrolytic capacitor (14) in the third circuit portion, and an additional switch (38) connected to both the first power supply (18) and the second power supply (28), wherein the first power supply (18) is configured to supply power to both the first and second circuit portions (12, 20) when the first controllable switch (19)

and the additional switch (38) are closed and the second controllable switch (30) is open, and wherein the second power supply (28) is configured to supply power to both the first and second circuit portions (12, 20) when the second controllable switch (30) and the additional switch (38) are closed and the first controllable switch (19) is open.

4. The control circuit (10) according to claim 3, wherein the switch control unit (36) is configured to control the switching state of the third controllable switch, wherein the third controllable switch is closed in the first control state, and wherein the third controllable switch is open in the second control state.

5. The control circuit (10) according to claim 4, wherein the third circuit portion is configured to supply a parking brake control (46) of the electric vehicle with electrical power.

6. The control circuit (10) according to claim 3, wherein the additional switch (38) connects the first power supply line (16) and the second power supply line (26) in a closed state, and wherein the additional switch (38) is coupled to the first or second power supply line (16, 26) on a side of the first or second controllable switch (19, 30) facing the first or second circuit portion (12, 20).

7. The control circuit (10) according to claim 1, wherein the first power supply line (16) and the second power supply line (26) run at least partially as one line on a side of the first controllable switch (19) or the second controllable switch (30) facing away from the first circuit portion (12) or the second circuit portion (20), respectively.

8. The control circuit (10) according to claim 1, wherein the first power supply line (16) is configured to be supplied with a first supply voltage and the second power supply line (26) is configured to be supplied with a second supply voltage.

9. The control circuit (10) according to claim 1, wherein the first circuit portion (12) and the second circuit portion (20) each comprise ceramic capacitors (22).

10. The control circuit (10) according to claim 1, wherein the first control state is configured to represent a driving state of the electric vehicle (50), and wherein the second control state is configured to represent a charging state of the electric vehicle (50).

11. A control method which is used in an electric vehicle (50),
wherein the control method is carried out by means of a control circuit (10) comprising:
a first circuit portion (12), which comprises electrolytic capacitors (14),
a first power supply (18),
a first power supply line (16), which is configured to supply the first circuit portion (12) with electrical power via the first power supply
a first controllable switch (19) in the first power supply line (16), wherein the first controllable switch (19) is configured to interrupt the first power supply line (16) in an open state in order to prevent the supply of electrical power to the electrolytic capacitors (14),
a second circuit portion (20),
a second power supply (28),
a second power supply line (26), which is configured to supply the second circuit portion (20) with electrical power via the second power supply,
a second controllable switch (30) in the second power supply line (26), wherein the second controllable switch (30) is configured to interrupt the second power supply line (26) in an open state,
a further first controllable switch (40) arranged on a side of all of the electrolytic capacitors (14) of the first circuit portion (12), the further first controllable switch (40) configured to interrupt the first power supply line in the open state, in synchronous operation with the first controllable switch, to prevent supply of power to all of the electrolytic capacitors (14) in the first circuit portion (12), the further first controllable switch unusable to control a state of the second circuit portion, and
a switch control unit (36), which is configured to control the switching states of the first controllable switch (19), the further first controllable switch (40), and the second controllable switch (30), wherein in a first control state the first controllable switch (19), the further first controllable switch (40), and the second controllable switch (30) are closed, and wherein in a second control state the first controllable switch (19) and the further first controllable switch (40) are open and the second controllable switch (30) is closed, and
wherein the control method comprises at least the following steps:
determining the control state from the functional requirements of the electric vehicle (50), and
controlling the first controllable switch (19) and the second controllable switch (30) via the switch control unit (36) according to the control state.

\* \* \* \* \*